PLURAL CHANNEL OBLIQUE IONOSPHERE SOUNDER SYSTEM

Filed Aug. 3, 1964

DAVID S. PRATT
INVENTOR

BY
Fleher and Swain
ATTORNEYS

DAVID S. PRATT
INVENTOR.

BY
Fleher and Swain
ATTORNEYS 3,443,230

PLURAL CHANNEL OBLIQUE IONOSPHERE SOUNDER SYSTEM

David S. Pratt, Sunnyvale, Calif., assignor to Granger Associates, Palo Alto, Calif., a corporation of California Filed Aug. 3, 1964, Ser. No. 386,902
Int. Cl. H04b *1/02, 1/68*
U.S. Cl. 325—67 1 Claim This invention relates generally to an ionosphere sounder system and more particularly to a receiver for such a system.

In point-to-point high frequency communications circuits, propagation uncertainties may arise because of atmospheric conditions, interferences and the like. The optimum communication frequency may also change as a function of time. There has been developed so-called ionosphere sounders to provide information regarding propagation uncertainties, propagation parameters and frequency changes.

Generally, ionosphere sounder systems comprise a transmitter which transmits over the same transmission path as the communication path and which is scanned through the frequency range of interest. The scanning is generally over a number of frequency bands and frequency channels in the range of interest. A receiver is provided for receiving the transmitted signal. Terminal equipment provides information with respect to the propagation parameters as a function of a frequency, so that transmission can be optimized.

One such type system employs an electronically step-tuned pulsed transmitter which is step-tuned rapidly through the high frequency range of interest. For example, the transmitter may be capable of transmitting a number of channels in one or more frequency bands within the range of interest. Any program of channel frequencies may be selected. The transmitter may transmit one or more pulses sequentially at each of a plurality of frequency channels over a predetermined frequency band or bands. A receiver is then tuned to receive the transmitted signal and provide a signal which can be processed to give information regarding the communication circuit parameters.

In the prior art, receivers of this type are broadly tuned to receive all frequency channels within a given band. The received signal is then processed by mixing in one or more stages to derive the output signal. In such systems, the local oscillator frequencies employed in the receiver are, in general, generated in a synchronism with the transmitter whereby to provide a constant intermediate frequency. In general, the local oscillators are controlled by a frequency standard which is set along with the frequency standard of the transmitter to a common standard.

It is an object of the present invention to provide an ionosphere sounding system which includes an electronically tuned preselector which is tuned in synchronism with the transmitter.

It is another object of the present invention to provide a receiver which includes a voltage-tuned preselector.

It is a further object of the present invention to provide a receiver which includes a preselector having voltage-tuned, resonant circuits and which is provided with a control waveform which causes it to track or tune in synchronism with the tuning of the transmitter.

These and other objects of the invention will become more clearly apparent from the following description.

Referring to the drawing.

Figure 1:
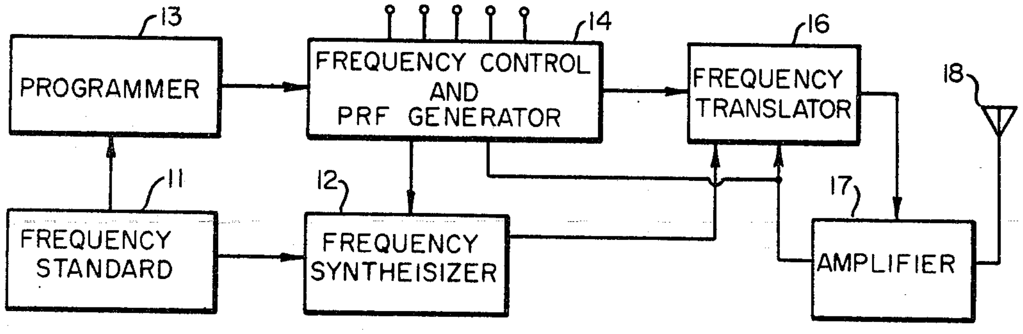
FIGURE 1 is a schematic block diagram of a typical transmitter.
Figure 2:
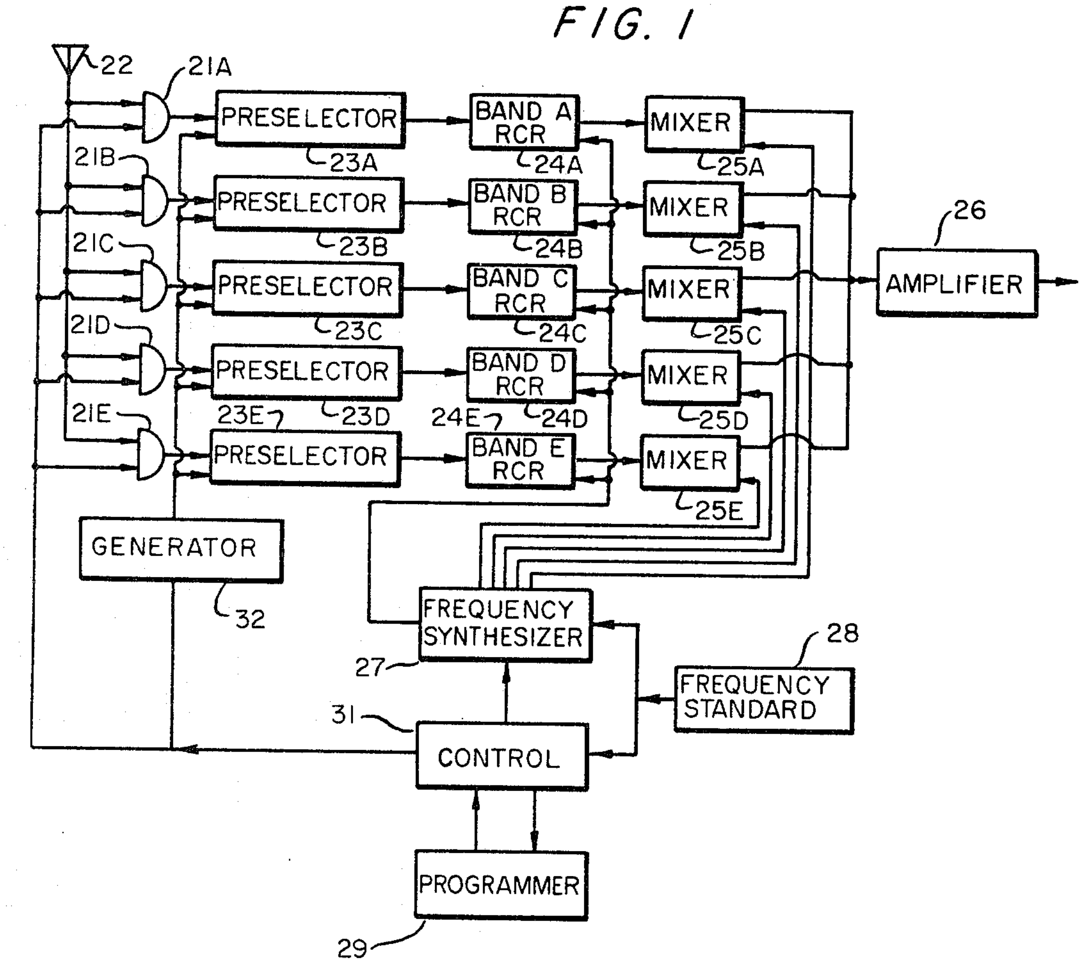
FIGURE 2 is a block diagram of a receiver in accordance with the invention.

Referring to FIGURE 1, the transmitter includes a frequency standard 11 which provides a standard frequency. The frequency standard may be referenced by setting it to a standard frequency such as the time pips from station WWV. The frequency standard may, for example, be a crystal-controlled oscillator which provides a stable output frequency. A signal from the frequency standard is applied to a frequency synthesizer 12 which, as will be presently described, generates a plurality of signal frequencies, i.e., in a five channel transmitter, it may generate 200 frequencies which are phase locked to the frequency standard. The frequency standard also provides its output to a programmer 13 which may, for example, include a digital clock and which starts the transmitter emitting at a preselected time. The programmer also provides signals to drive the frequency controller and pulse rate generator 14.

The frequency controller and pulse rate generator include means for selecting the channel program, that is, the various frequencies which are to be emitted. The controller also includes means for selecting the pulse rate frequency at which these frequencies are emitted, the pulse length of the transmitted pulses and the pulses per channel. The pulse rate is obtained by controlling or gating the frequency translator and the multiplier 16. The frequency synthesizer provides its output to the frequency translator which generates the output carrier signal. This signal is gated to one or more amplifying stages 17 which provide an amplified signal to the transmitting antenna 18.

The transmitter may transmit over five frequency bands in a given frequency range. For example, in the frequency range 2 to 63.6 mc., the bands may be 2.0 mc. to 3.95 mc., 4.05 mc. to 7.95 mc., 8.10 mc. to 15.90 mc., 16.2 mc. to 31.80 mc. and 32.40 mc. to 63.6 mc. Within each of the frequency bands there may be forty frequency channels spaced apart 50 kc., 100 kc., 200 kc., 400 kc. and 800 kc. respectively for the five frequency bands.

The programmer and control unit may be set to provide one or more pulses sequentially or randomly at each of the frequency channels. For example, it may provide sequentially a single frequency channel at each frequency within each of the bands in the frequency range of the transmitter.

The transmitted signal is then received by a receiver which may either receive the signal on a skip basis, that is, the receiver is located at a remote location or a reflected signal, that is, the receiver is located adjacent the transmitter location (a back-scatter sounding system).

In either case, the receiver includes a plurality of band gates 21A–21E which selectively gate the signals from the receiving antenna 22 to an associated preselected 23A–23E. The preselector electronically tuned, as will be presently described, to scan in synchronism with the transmitter over the plurality of frequency channels within each of the frequency bands being transmitted by the transmitter.

The outputs of the preselectors are applied to band receivers 24A–24E, each of which has a variable local oscillator frequency applied thereto from the frequency synthesizer 27. The local oscillator frequencies are stepped in synchronism with the received signal. Each receiver provides an intermediate frequency signal to a mixer 25A–25E. A local oscillator frequency is applied to each of the mixers 25A–25E from the synthesizer 27. The output of the mixers 25A–25E is combined and applied to amplifier 26. The output of the amplifier is processed to provide the transmission information.

The variable local oscillator frequency and the fixed local oscillator frequencies are provided by a frequency synthesizer 27 which is controlled by a local frequency standard 28 which is referenced to a common reference source, for example, station WWV. Standard frequency is also applied to control unit 31. Programmer 29 receives signals from the control unit and serves to program the receiver in synchronism with the programming of the transmitter. The control unit provides control signals to the frequency synthesizer, to gates 21A–21E and to generator 32 which provides voltages for application to each of the voltage-tuned preselector units to tune them in synchronism with the transmitter.

Figure 3:
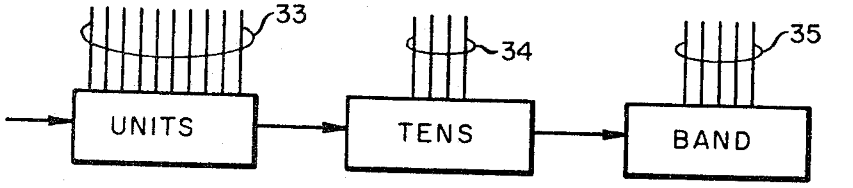
FIGURE 3 is a schematic block diagram of a control unit in the receiver of FIGURE 2.

The control unit 31 may, for example, include digital counters arranged in the series shown in FIGURE 3 with a units counter serving to receive the standard frequency. These counters serve as dividers. Each of the ten lines 33 is energized in sequence to provide digital information from 0 through 9. The output of the units counter is applied to tens counters which provide over four lines 34 tens information from 0 to 3. Thus, the units and tens counters provide forty frequency channels. The output of the tens channel may also be applied to a band selector so that each time a count of forty is reached, the band selector is advanced to the next frequency band. This is achieved by energizing lines 35 which are individually connected to each of the gates to control the same in timed sequence under the control of the programming unit.

Figure 4:
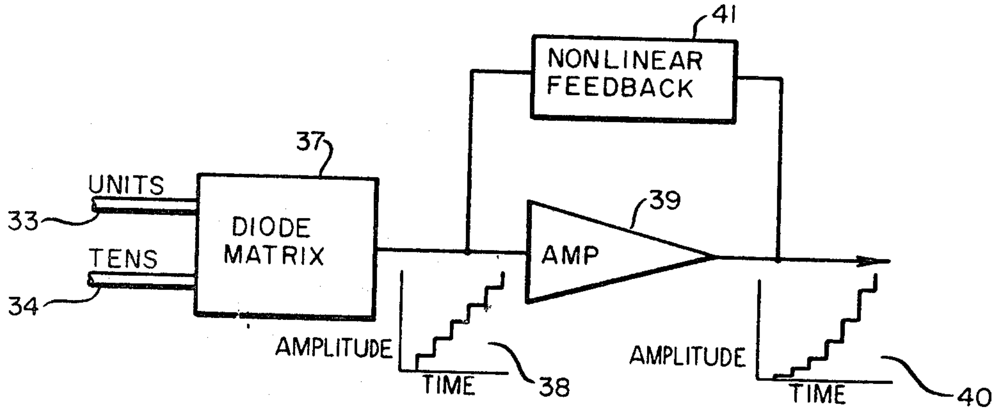
FIGURE 4 is a block diagram of a generator for generating a tuning waveform for tuning the preselector.

The units and tens output of the controller is applied to a generator 32 which provides voltages to tune the preselectors in synchronism with the transmitter. The generator may be a modified staircase generator, FIGURE 4. It may include a diode matrix 37 which provides a staircase voltage such as illustrated at 38 including forty discrete steps. The output of the diode matrix may be applied to an operational amplifier 39 which includes a nonlinear feedback circuit 41 whereby the linear staircase voltage 38 is modified as shown at 40 to provide an exponential or nonlinear step voltage for application to the preselector circuits. The waveform for the staircase voltage is selected such that voltage-tuned circuits tune linearly over the channel frequencies. If linear voltage-tuned circuits are available, the linear staircase voltage from the diode matrix can be used directly. Where a random program is being received, discrete voltages are applied to the preselectors such as to correctly tune the same. These voltages will correspond to the steps in the staircase voltage.

Figure 5:
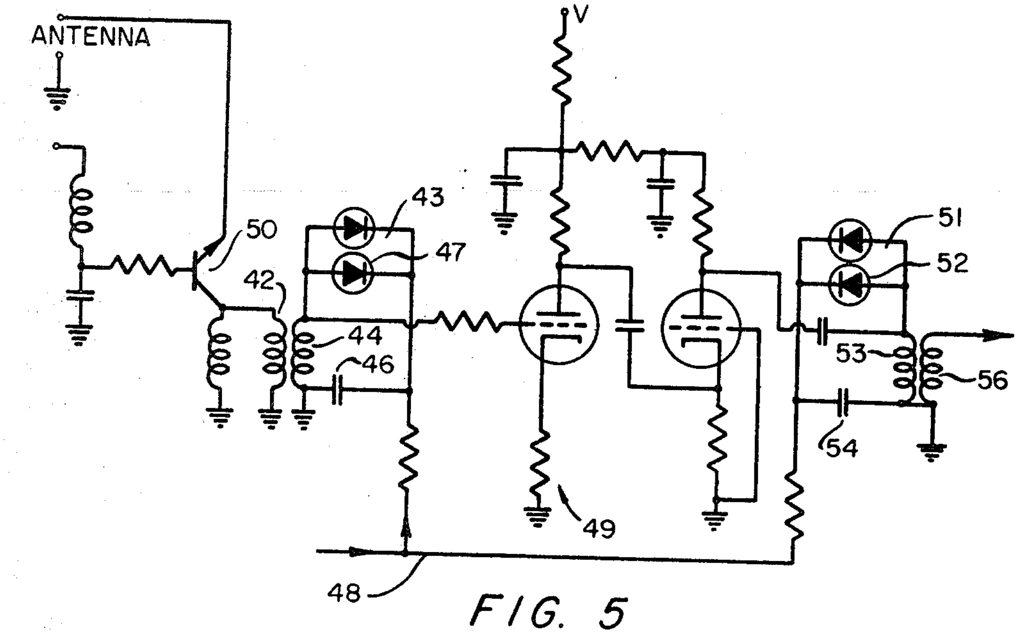
FIGURE 5 is a circuit diagram of the preselector section of the receiver shown in FIGURE 2.

The gating and preselector circuits may be such as those shown in FIGURE 5. They include a gate transistor 50 having its emitter connected to receive the signal from the antenna and its base adapted to be controlled by the channel band select signals on lines 35 whereby to pass the signal received by the antenna to the associated transformer 42. The transformer couples the tuned circuit to the antenna. The tuned circuit includes an inductance 44, fixed capacitor 46 and voltage variable capacitors 47. The voltage variable capacitors may, for example, be reverse biased diodes in which the space charge layer at the junction is varied in response to the voltage applied thereto to thereby change their capacity. The staircase voltage waveform is applied along line 48 to the voltage-tuned capacitors to tune the circuit 43 through the forty frequency channels. The output of the tuned circuit is amplified by the cascade amplifier 49 and the output of the amplifier is applied to a second tuned circuit 51 which includes voltage variable devices 52, inductor 53 and fixed capacitor 54. The output of this tuned circuit is applied through a transformer 56 to an associated receiver.

Semiconductor devices of the voltage variable type as shown at 47 and 52 do not have a linear change in the capacitance with the change in the voltage. In order to tune the receiver linearly, a staircase voltage must be applied thereto which is exponential such as shown at 40. Each of the steps of the staircase voltage tunes the receiver over a relatively narrow band, for example, 50 kc. at the lower frequency, whereby to be sharply tuned to receive the transmitted frequency of that channel only. The sharp tuning reduces effects of channel interference and provides a better signal to noise ratio. Where the channels are randomly programmed, the preselector is randomly tuned in synchronism. It is still required to generate voltages which correctly tune the preselector. These voltages will have an amplitude equal to the corresponding step in the staircase voltage.

I claim:

1. In a sounding system of the type described where a transmitter emits a program of one or more pulses at each of a plurality of frequency channels in time sequence in one or more predetermined frequency bands, and a remotely located receiver receives said pulses to provide information with respect to the transmission of said pulses, said receiver including, preselector means for selection of one of said predetermined frequency channels including a voltage or current sensitive tuned input circuit including at least one passive element which changes in value in response to a change in said voltage or current, means for generating an electrical signal for application to said tuned input circuit to program the tuning of the same in synchronism with said transmitter to receive said one or more pulses such means generating a stairstep voltage or current whose increments are in synchronism with the change of frequency channels, mixer means coupled to said preselector means for providing an output signal having transmission information for the signal path between said transmitter and receiver.

References Cited

UNITED STATES PATENTS 3,001,067 9/1961 Manahan ---------- 325—144

OTHER REFERENCES

Naismith and Bailey: "An Automatic Ionospheric Recorder for the Frequency Range 0.55 to 17 Mc./S.": in Institute of Electrical Engineers Journal, (London), vol. 98, part III, No. 51, January 1951, pp. 11–18 and 45–46.

Weldon and Koposki: "Boost for Electronic Tuning, Part 1," Electronics, Apr. 6, 1965, pp. 49–53.

Friend and Colwell: "Measuring the Reflecting Region in the Troposphere," Proceedings of the Institute of Elec. Engineer, volume 25, No. 12, December 1937, pp. 1531–1541.

ROBERT L. GRIFFIN, *Primary Examiner.*

BENEDICT V. SAFOUREK, *Assistant Examiner.*

U.S. Cl. X.R.

325—63, 333; 343—13